United States Patent [19]

Nabulsi

[11] Patent Number: 4,500,916
[45] Date of Patent: Feb. 19, 1985

[54] AUTOMATIC ON-AIR REGISTRATION SYSTEM AND METHOD FOR COLOR TV CAMERA

[75] Inventor: Hazem Nabulsi, Santa Clara, Calif.

[73] Assignee: Panavision, Inc., Tarzana, Calif.

[21] Appl. No.: 365,546

[22] Filed: Apr. 5, 1982

[51] Int. Cl.³ .............................................. H04N 9/09
[52] U.S. Cl. .................................................... 358/51
[58] Field of Search ........................................ 358/51

[56] References Cited

U.S. PATENT DOCUMENTS

| | | | |
|---|---|---|---|
| 3,404,220 | 10/1968 | Favreau | 178/5.2 |
| 3,471,634 | 10/1969 | Clark et al. | 178/5.2 |
| 3,510,669 | 5/1970 | Peraza | 178/6.8 |
| 3,621,122 | 11/1971 | Hipwell | 178/5.4 |
| 3,692,918 | 9/1972 | Olson et al. | 178/5.4 |
| 3,700,789 | 10/1972 | Ryley et al. | 178/5.4 |
| 3,700,790 | 10/1972 | Ryley | 178/5.4 |
| 3,705,839 | 12/1972 | Taylor | 178/5.4 |
| 3,740,608 | 6/1973 | Manber et al. | 315/27 |
| 3,758,825 | 9/1973 | Kapers, Jr. | 315/276 |
| 3,764,735 | 10/1973 | Dieter-Schneider et al. | 178/5.4 |
| 3,830,959 | 8/1974 | Dischert et al. | 178/5.4 |
| 3,838,310 | 9/1974 | Varian | 315/13 |
| 3,852,640 | 12/1974 | McCarthy | 315/276 |
| 3,925,812 | 12/1975 | Blom et al. | 358/51 |
| 3,987,482 | 10/1976 | Robers | 358/51 |
| 4,053,203 | 10/1977 | Monahan | 358/51 |
| 4,053,926 | 10/1977 | Lemoine et al. | 358/8 |
| 4,099,092 | 7/1978 | Bristow | 315/10 |
| 4,122,485 | 10/1978 | Sonntag et al. | 358/51 |
| 4,133,003 | 1/1979 | Flory et al. | 358/51 |
| 4,166,280 | 8/1979 | Poole | 358/51 |
| 4,176,374 | 11/1979 | Eames | 358/51 |
| 4,203,051 | 5/1980 | Hallett et al. | 315/13 |
| 4,234,890 | 11/1980 | Astle et al. | 358/10 |
| 4,280,138 | 7/1981 | Stock | 358/150 |
| 4,285,004 | 8/1981 | Morrison et al. | 358/10 |
| 4,287,506 | 9/1981 | Richards | 340/146.3 |
| 4,298,944 | 11/1981 | Stoub et al. | 364/515 |
| 4,305,022 | 12/1981 | Mitamura et al. | 315/370 |
| 4,314,272 | 2/1982 | Miyaji et al. | 358/10 |
| 4,318,124 | 3/1982 | Nakamura et al. | 358/51 |

FOREIGN PATENT DOCUMENTS

| | | |
|---|---|---|
| 1272970 | 5/1972 | United Kingdom .................. 358/51 |
| 1353147 | 5/1974 | United Kingdom . |
| 1358833 | 7/1974 | United Kingdom . |
| 1368946 | 10/1974 | United Kingdom . |
| 1590950 | 6/1981 | United Kingdom . |
| 2074416A | 10/1981 | United Kingdom . |
| 2073996A | 10/1981 | United Kingdom . |

OTHER PUBLICATIONS

Smith, N., "The Mark IXB—An Update for the Mark IX Colour Camera".
Smith, N., "The Mark IX—A Camera System for the 80s", *Communication & Broadcasting*, Spring 1978.
Crook, J. et al., "A New Studio Outside Broadcast Camera Channel", *Communication and Broadcasting*.
Heightman, A., "A High-Performance Automatic Color Camera", *IEEE Transactions on Broadcasting*, vol. BC-18, No. 1, Mar. 1972.
Smith, N., "Design of a Modern Automatic Colour-Television Camera", *Journal of Science & Technology*, vol. 39, No. 3, 1972.
Favreau, M. et al., "Les Nouveaux Equipements Video de la 3 Chair de Television O.R.T.F.", *L'onde Electrique*, vol. 53, Fasc. 9.

*Primary Examiner*—Richard Murray
*Attorney, Agent, or Firm*—Shapiro and Shapiro

[57] ABSTRACT

Horizontal and vertical registration errors in a color television camera are automatically corrected on-air by detecting registration errors in live scenes, associating each error with a preselected region of the raster in which it was detected, separately accumulating errors for each region, periodically analyzing the distribution, magnitudes and signs of the accumulated errors, and the past history of registration errors to determine the type of registration error present, and generating a correction signal to correct the registration error. Vertical registration is effected using vertical video signals derived by sampling the component color video signals from the camera along vertical lines of the raster. A microprocessor-controlled automatic registration system is disclosed.

23 Claims, 20 Drawing Figures

V & H: CORRECT SIZE. NO CENTERING CHANGE

V. SIZE ERROR

H. SIZE ERROR

FIG. 8B.

V: MOVE CENTERING ↓
H: MOVE CENTERING →
NO SIZE CHANGE

V. CENTERING ERROR

H. CENTERING ERROR

FIG. 9.

TIME $t_1$

V: MOVE CENTERING ↓
H: MOVE CENTERING ←
NO SIZE CHANGE

V

H

TIME $t_2$

V: MOVE CENTERING ↓
H: MOVE CENTERING ←
NO SIZE CHANGE

V

H

TIME $t_3$

V: MOVE CENTERING ↑
H: MOVE CENTERING →
V & H: CORRECT SIZE

V

H

AUTOMATIC ON-AIR REGISTRATION SYSTEM AND METHOD FOR COLOR TV CAMERA

BACKGROUND OF THE INVENTION

This invention relates generally to color television cameras, and more particularly to the automatic correction of registration errors.

Color television cameras generally comprise multiple image pick-up devices, e.g., tubes, that generate separate video signals representative of component colors of a scene being viewed by the camera. The necessity for accurate registration, i.e., synchronization, of the video signals produced by a color television camera so that the signals simultaneously convey information related to the same portion of an image is well known, and the prior art is replete with various automatic registration systems for this purpose.

Many known automatic registration systems require the use of a special registration set-up chart (or a diascope inside of the camera lens) to enable a predeter-Mined pattern of figures to be imaged onto the pick-up devices of the camera, and registration is performed as part of the normal camera set-up procedure prior to going "on-air". As the pattern is scanned, transitions in the video signals associated with the edges of the figures are compared, and correction signals are applied to the scan circuits of the camera so that corresponding transitions in the different video signals occur simultaneously. The correct operation of many such systems is dependent upon the existence of video signal transitions in predetermined regions of the raster and, in some cases, upon transitions between full black and full white levels. Over a period of time, however, registration can change, because of temperature or voltage changes, or because of drift in electrical circuits, and the camera must be taken "off-air" to readjust the registration.

Although there are automatic registration systems that operate on-air to correct registration errors, those systems have limited capability or have other disadvantages which have limited their usefulness. It is desirable to provide improved systems and methods that are capable of operating on-air with live or actual scenes to automatically detect and correct registration errors in color television cameras, and it is to this end that the present invention is directed.

SUMMARY OF THE INVENTION

The invention provides a method and a system for automatically correcting registration errors in a color television camera that avoids the above-noted and other disadvantages of known registration correction methods and systems. The invention does not require registration charts or other predetermined patterns, and will operate with images having significantly less detail at particular locations and contrast than required by prior art "on-air" systems. The invention is capable of detecting registration errors using actual televised scenes, and can correct errors while the camera is on-air.

In accordance with one aspect of the invention, video signals representative of different component colors of a scene being raster scanned by a color television camera are sampled at a plurality of different points in the raster to detect amplitude level transitions associated with the edges of objects in the scene being scanned. The transitions are compared to detect misregistration of the video signals, and for each misregistration detected, an error signal is produced. The error signals are accumulated separately for each of preselected regions of the raster, and the accumulated error signals associated with different regions are analyzed to determine the type of registration error present. Based upon the analysis, a correction signal is generated.

Significantly, the invention determines the type of registration error present by analyzing the distribution, the values, and the past history of errors. Moreover, since the invention operates continuously to detect and analyze error signals, the error signals may be integrated over a period of time, thereby enabling registration information to be derived from a large number of video frames so that more accurate corrections can be made. Also, proper registration can be maintained by applying small, incremental correction signals that would be undetectable to a television viewer, thus enabling the on-air operation.

DESCRIPTION OF THE PREFERRED EMBODIMENT

The invention will be described in connection with a three-tube color television camera, since this type of camera is one of the most widely used. However, as will be apparent from the description which follows, the invention is also applicable to other types of color television cameras, e.g., two-or four-tube cameras, and is also applicable to other types of systems where it is desired to synchronize scanning rasters and the like.

In a typical three-tube color television camera, each camera tube raster scans an image of a scene being viewed by the camera and generates a corresponding component color video signal. The video signals from the camera tubes correspond, respectively, to red, blue, and green component colors, and their amplitudes vary in accordance with the brightness along horizontal raster scan lines of objects in the scene. Each camera tube has its own horizontal and vertical scanning circuits which control the raster scan of the tube. Registration errors occur if the three rasters are not perfectly synchronized and aligned spatially in both the horizontal and vertical directions. Misregistration of the rasters may be caused, for example, by errors in centering or size or by non-linearities.

As will be described in more detail shortly, horizontal registration errors are detected by comparing sampled component color video signals for corresponding horizontal raster lines (hereinafter referred to as "horizontal video signals"). Vertical registration errors are detected by constructing from each horizontal video signal a "vertical video signal" corresponding to the brightness of objects in the scene along a vertical line located at a predetermined horizontal position of the raster, and by comparing the vertical video signals representing different component colors. For both horizontal and vertical registration, the green video signal is used as a reference to which the red and blue video signals are compared, and appropriate correction voltages are applied to the sweep circuits of the red and blue tubes to correct registration errors. The invention operates by sampling the video signals at a plurality of different points in the raster to detect amplitude level transitions that are associated with the edges of objects in the scene being scanned. The transitions are compared for time coincidence to detect misregistration of the video signals, and for each misregistration detected, an error signal is produced. Each error signal is associated with one of a preselected number of regions of the raster in which the error signal was produced, and the error signals for each region are accumulated. Periodically, e.g., every 16 frames, the accumulated error signals may be analyzed to determine the type of registration error present, and, based upon the analysis, an appropriate correction signal is generated to correct the registration error.

Figures 1, 2:
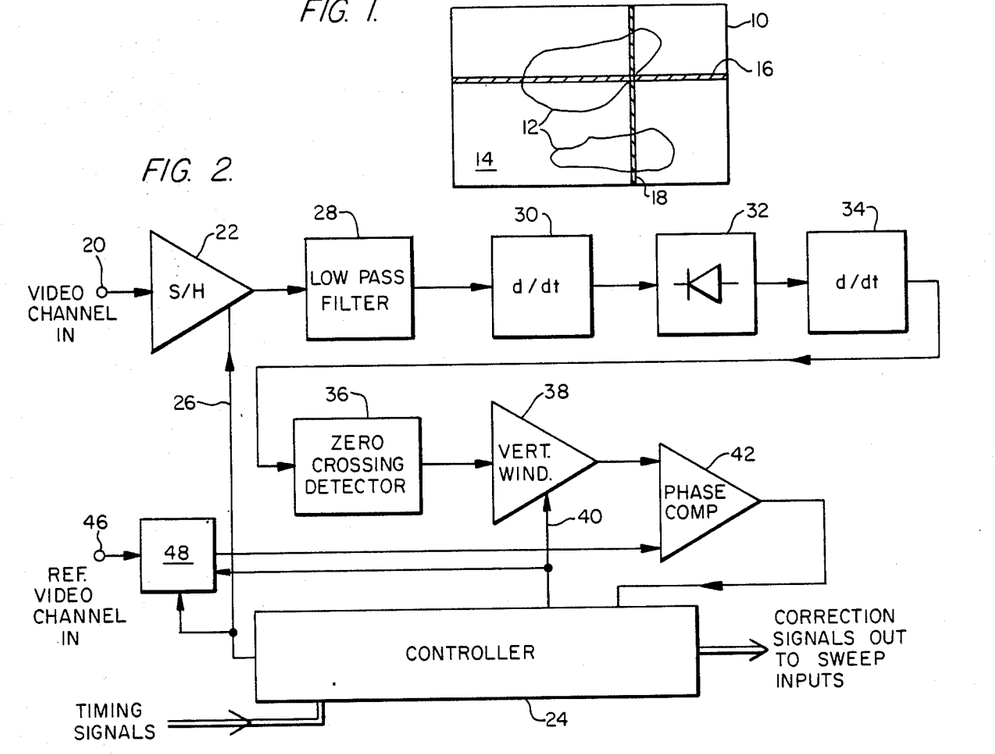
FIG. 1 is a diagrammatic view of an exemplary television raster display illustrating the manner in which sample points are selected.
FIG. 2 is a block diagram of a system embodying the invention for detecting and correcting vertical registration errors.

FIG. 1 illustrates an exemplary raster display 10 of a scene being viewed by the camera. For purposes of explanation, it is assumed that the scene comprises a pair of irregularly shaped bright objects 12 located on a dark background 14. The objects and the background may be of any contrasting colors or black and white. It is not necessary that they be black and white as is required by many known registration systems. As is well known, the raster is composed of a plurality of horizontal lines (525 in the NTSC system) and each raster frame is composed of an even and an odd field of interlaced horizontal lines (the lines are not illustrated in FIG. 1). The cross-hatched horizontal and vertical segments 16 and 18 in FIG. 1 represent, respectively, illustrative vertical and horizontal sample positions. Vertical video signals are constructed in the following manner.

Referring to FIG. 2, a component color, e.g., red, horizontal video signal may be input on a terminal 20 to a conventional sample-and-hold (S/H) circuit 22. At a predetermined horizontal position, for example, position 18 in FIG. 1, of each horizontal raster line, a controller 24 (to be described in more detail hereinafter) supplies a strobe pulse to S/H circuit 22 via line 26, causing the S/H circuit to capture and hold the instantaneous amplitude value of the video signal on terminal 20. The S/H circuit retains that instantaneous value regardless of subsequent changes at its input until the next strobe pulse is received. The output from the S/H circuit is applied to a low pass filter 28, which may be a second order low pass filter having a cutoff frequency of approximately 4 KHz. The filter output is differentiated at 30, as by a conventional R-C differentiator, full wave rectified at 32, differentiated a second time in differentiator 34, and applied to a zero crossing detector 36. The zero crossing detector, which may be of conventional design, outputs pulses at the zero crossings of the signal from differentiator 34. The pulses from the zero crossing detector are applied to a vertical window circuit 38, which may be a conventional logic circuit. At a predetermined vertical position, such as position 16 in FIG. 1, vertical window circuit 38 may be enabled for a predetermined time by a pulse on line 40 from controller 24 to apply the output of the zero crossing detector to one input of a phase comparator 42. Reference will now be made to FIGS. 3A–3G and 4A–4C, which illustrate the waveforms at various locations in the system of FIG. 2.

Figure 3:
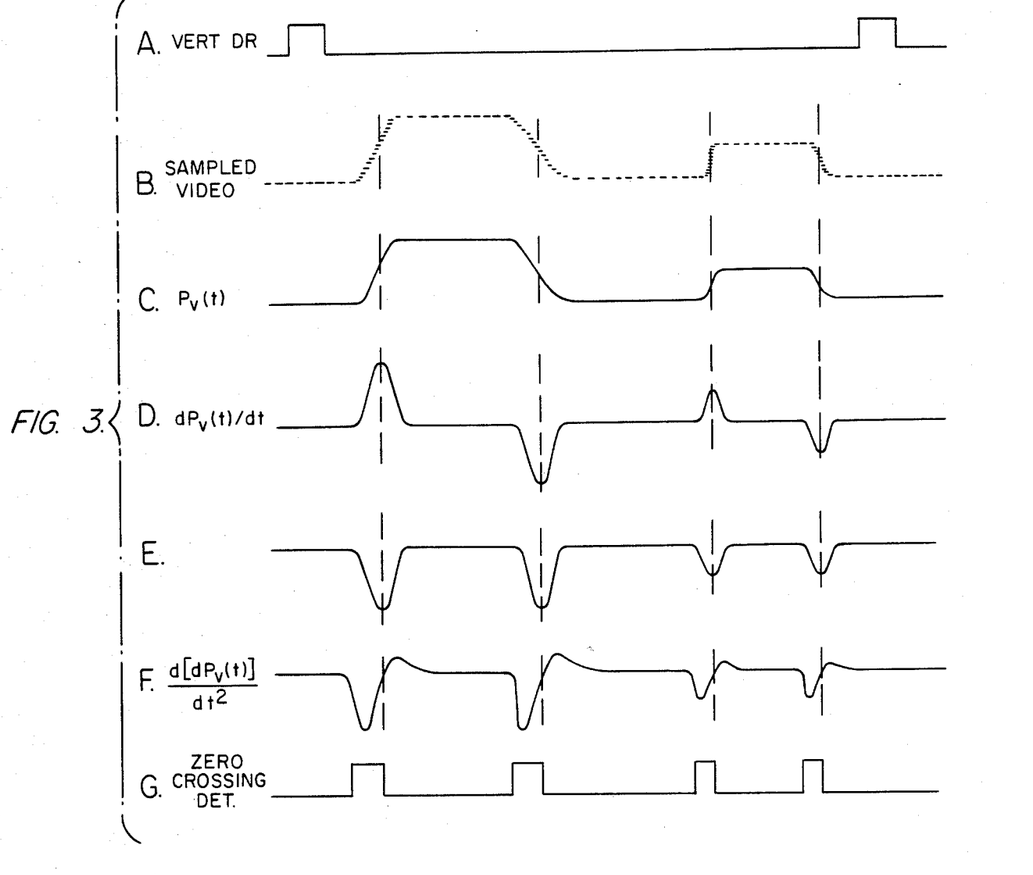
FIGS. 3A–3G and FIGS. 4A–4C are timing diagrams illustrating waveforms at various locations in the system of FIG. 2.
Figure 4:
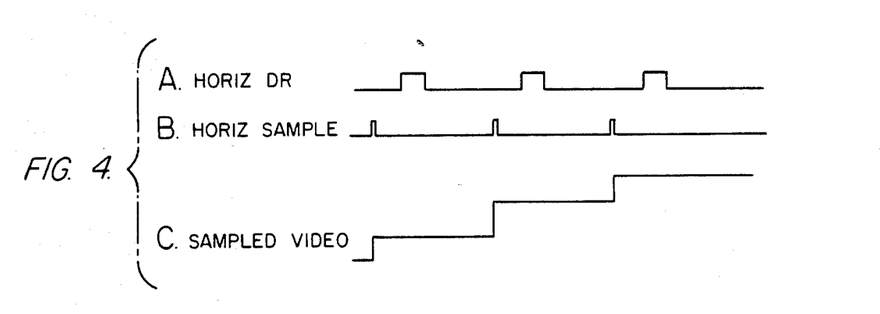

FIG. 3A is the vertical drive signal produced by the camera, the distance between the pulses corresponding to the time required for one raster field. FIG. 4A is the horizontal drive signal from the camera and each pulse corresponds to a horizontal raster line. (The time scales of FIGS. 3 and 4 are different.) FIG. 3B represents the sampled video output of the S/H circuit 22 along vertical line 18 (FIG. 1) for one complete field. The ordinate position of each dash in FIG. 3B corresponds to the amplitude of the video signal at horizontal sample position 18 for a different horizontal line. Referring to FIGS. 1 and 3B, as each horizontal line is sampled (beginning with the first scan line that crosses the upper edge of upper object 12) at horizontal position 18, the sampled video shows a transition from a low amplitude value corresponding to the dark background 14 to a high amplitude value corresponding to the brightness of the upper object 12 in FIG. 1. A number of horizontal lines are required for the complete transition between amplitude levels. The sharpness of the transition is influenced, for example, by the sharpness of focus of the object. The sampled video remains at the high amplitude level as successive horizontal lines scan the object. At the lower edge of the object (at approximately the intersection of cross-hatched lines 16 and 18), another transition occurs as the amplitude of the video signal drops back to the level of the dark background, where it remains until the upper edge of the lower object in the figure is scanned, at which time another transition occurs, as shown.

FIG. 4C illustrates the sampled video output of the S/H circuit for three successive horizontal lines during a positive-going transition. The controller 24 generates horizontal sample pulses (FIG. 4B) at a predetermined time during each horizontal line corresponding to the selected horizontal sample position 18. The horizontal sample pulses, which may be of the order of 0.5 microseconds, are the strobe pulses applied to S/H circuit 22 via line 26. As shown, each horizontal sample pulse activates the S/H circuit to capture and hold the instantaneous amplitude value of the video until the next sample pulse occurs. Low pass filter 28 smoothes the sampled video signal to produce a vertical video signal $P_v(t)$, as shown in FIG. 3C. The output of differentiator 30 (FIG. 3D) is the first derivative of the vertical video signal, and represents its slope. As shown, the output of differentiator 30 has positive and negative peaks corresponding to respective positive- and negative-going transitions in the vertical video signal. The absolute maximum values of the peaks correspond to the points of maximum slope in the vertical video signal, which occur at the midpoints of the transitions.

Full wave rectifier 32 rectifies the positive peaks (FIG. 3E) to enable the system to take advantage of both positive- and negative-going transitions in the vertical video signal. Differentiator 34 forms the second derivative of the vertical video signal (FIG. 3F), and has zero crossings that occur at the midpoints of the transitions. The zero crossing detector 36 detects the zero crossings and outputs pulses (FIG. 3G) having their trailing edges located at the zero crossings.

A reference horizontal video signal, e.g., green, on an input terminal 46 may be processed in exactly the same manner as that just described for the video signal on terminal 20, in a circuit 48 that may be identical to blocks 22 and 28-38, to provide a second input to phase comparator 42. The phase comparator, which may be of conventional design, compares corresponding transition midpoints of the two vertical video signals, i.e., zero crossings, occurring at vertical sample position 16 for time coincidence. The output of the phase comparator is an error signal that is positive, negative or zero, depending upon whether the transition midpoint of the vertical video signal derived from the input at terminal 20 leads, lags, or is in phase with the transition midpoint of the reference vertical video signal at terminal 46. Since, in general, the amplitude levels of the transitions of the two video signals will not be equal (unless the transition is between black and white), comparing transition midpoints is preferable to comparing amplitude levels to a threshold value, since the transition midpoints of the two video signals are independent of amplitude levels. When the amplitude levels of the transitions are not equal, comparing transitions by employing thresholds can result in an erroneous indication of misregistration.

As mentioned earlier, controller 24 produces a horizontal sample pulse (strobe pulse) at a preselected horizontal sample position, e.g., position 18 in FIG. 1, of each horizontal raster line. The horizontal sample pulses are applied to S/H circuit 22 and to a corresponding S/H circuit in block 48 that samples the reference horizontal video signal to derive the vertical video signals. The controller also generates an enabling pulse on line 40 to vertical window circuit 38, and to a corresponding circuit in block 48, at a predetermined vertical sample position, e.g., vertical position 16 in FIG. 1, during each raster field. The enabling pulses on line 40 preferably enable the vertical window circuits for a period of time corresponding to approximately 8 horizontal lines. The effect of the horizontal and vertical sampling is to sample the video signals at a raster location corresponding to the intersection of the crosshatched horizontal and vertical lines in FIG. 1. If an object in the scene being scanned by the camera has an edge at this sample location (as it does in FIG. 1) transitions in the video signals corresponding to this edge will be compared for time coincidence in phase comparator 42, and an error signal will be produced if a misregistration of the video signals is detected. As noted earlier, the error signal will have a sign, i.e., polarity, that indicates the direction of misregistration. If either input to the phase comparator is zero, as is the case when there are no vertical details in the scene at the selected sample location, the phase comparator output will be zero.

Preferably, there are 256 possible horizontal sample positions and 256 possible vertical sample positions of the raster, which are selected in a predetermined sequence by the controller using timing signals from the camera. The horizontal sample position is preferably held constant for only one frame, and a new horizontal sample position is selected with each new frame. Preferably, the horizontal sample position is not moved consecutively to each of the 256 sample positions, but is stepped across the raster in large increments, e.g., by 32 positions per step. For example, beginning at position 0, the horizontal sample position would be stepped to position 32, for the next frame, then to position 64, etc., across the raster. Sample positions may be controlled conveniently using a counter that counts by 32 to 256. When an overflow occurs, i.e., the count exceeds 256, instead of going back to position 0, the next sequence may start from position 1, so that horizontal samples will be sequentially located at positions 1, 33, 65, etc. At subsequent overflows, the sequence would then begin at position 2, then at position 3, etc., up to position 8, then back to position 0. Moving the horizontal sample position in steps of 32 allows the horizontal sample to traverse the raster every 8 frames, and staggering the starting position with each new traversal enables data to be obtained from different sample positions.

The vertical sample position may be stepped by 32 positions in the same manner as the horizontal sample position. However, the vertical sample position is preferably held constant during each traversal of the raster by the horizontal sample, i.e., for 8 frames, and then moved to its next position. The vertical sample position may also be controlled by a counter that counts by 32 to 256.

Controller 24 receives the error signals from phase comparator 42 for each misregistration detected, associates each error signal with a predetermined region of the raster in which it was produced, and preferably accumulates each error signal with previously detected error signals in the same region, as will be described more fully hereinafter. The error signals may be accumulated for a predetermined period of time, e.g., 16 frames, and then analyzed by the controller to determine the type of registration error present. The controller then provides appropriate correction signals to the camera sweep inputs to correct the registration error. As will be noted hereinafter, controller 24 is preferably implemented as a microprocessor, such as a Motorola type 6803, along with associated memory and logic.

Horizontal registration errors may be detected in a similar manner as that just described for vertical registration errors using a system similar to that illustrated in FIG. 2. However, horizontal registration error detection does not require a S/H circuit or a low pass filter, and the horizontal video signals may be supplied directly to a differentiator, e.g., such as differentiator 30. Since the horizontal line rate is much faster than the vertical field rate, the circuit time constants of the horizontal error detection system will have to be adjusted appropriately to provide a greater bandwidth. Horizontal error detection differs from vertical error detection in that every horizontal line of the field may be examined at the selected horizontal sample position, e.g., position 18 in FIG. 1, for errors, and the error signals from the phase comparator may be integrated over the entire field. For this purpose, vertical window circuit 38 may be replaced with a logic circuit that gates the output of a zero crossing detector in the horizontal error detection system to the phase comparator at the selected horizontal sample position for each horizontal line. The logic circuit is enabled by a pulse on line 40 from the controller at the horizontal sample position of each line, and a capacitor in the output of the phase comparator may be used to integrate the error signals over the field.

Figure 5:
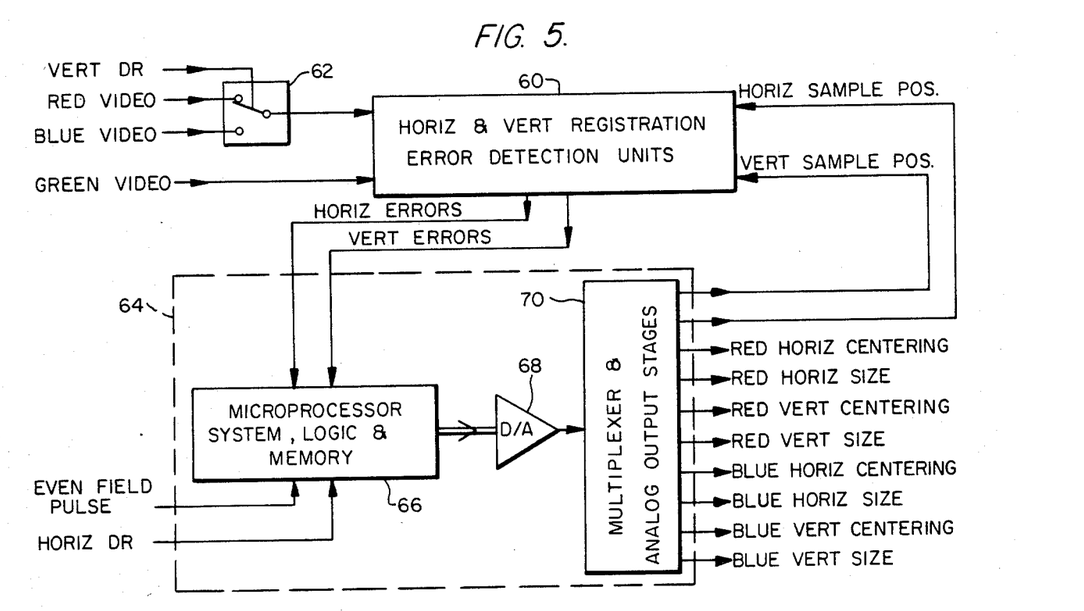
FIG. 5 is a block diagram of a system embodying the invention for detecting and correcting horizontal and vertical registration errors, the figure illustrating in more detail a preferred form of a controller of the system.

FIG. 5 is a block diagram of a system that detects and corrects horizontal and vertical registration errors in a three-tube color television camera. To simplify the explanation, the system will be described in the context of detecting and correcting only centering and size errors, although it will be appreciated from the description which follows that the invention may also be employed for correcting linearity errors, as well as for performing shading corrections, for example.

As shown in FIG. 5, the system may comprise a vertical registration error detection unit, as illustrated in FIG. 2 (but without the controller 24), and a horizontal registration error detection unit as described above. The horizontal and vertical registration error detection units are indicated in FIG. 5 as block 60. As shown, the horizontal and vertical registration error detection units receive the green horizontal video signal, which is used as the reference video, and receive either the red or the blue horizontal video signals as determined by the position of a switch 62. The switch may be driven by the vertical drive signals (see FIG. 3A) to alternately connect either the red or the blue video to the error detection units. Each vertical drive pulse toggles the switch so that the red video may be connected to the error detection units during even raster fields and the blue video may be connected to the error detection units during odd fields. Time multiplexing the red and blue video to the error detection units in this manner eliminates the necessity for separate units for each color.

Figure 6A:
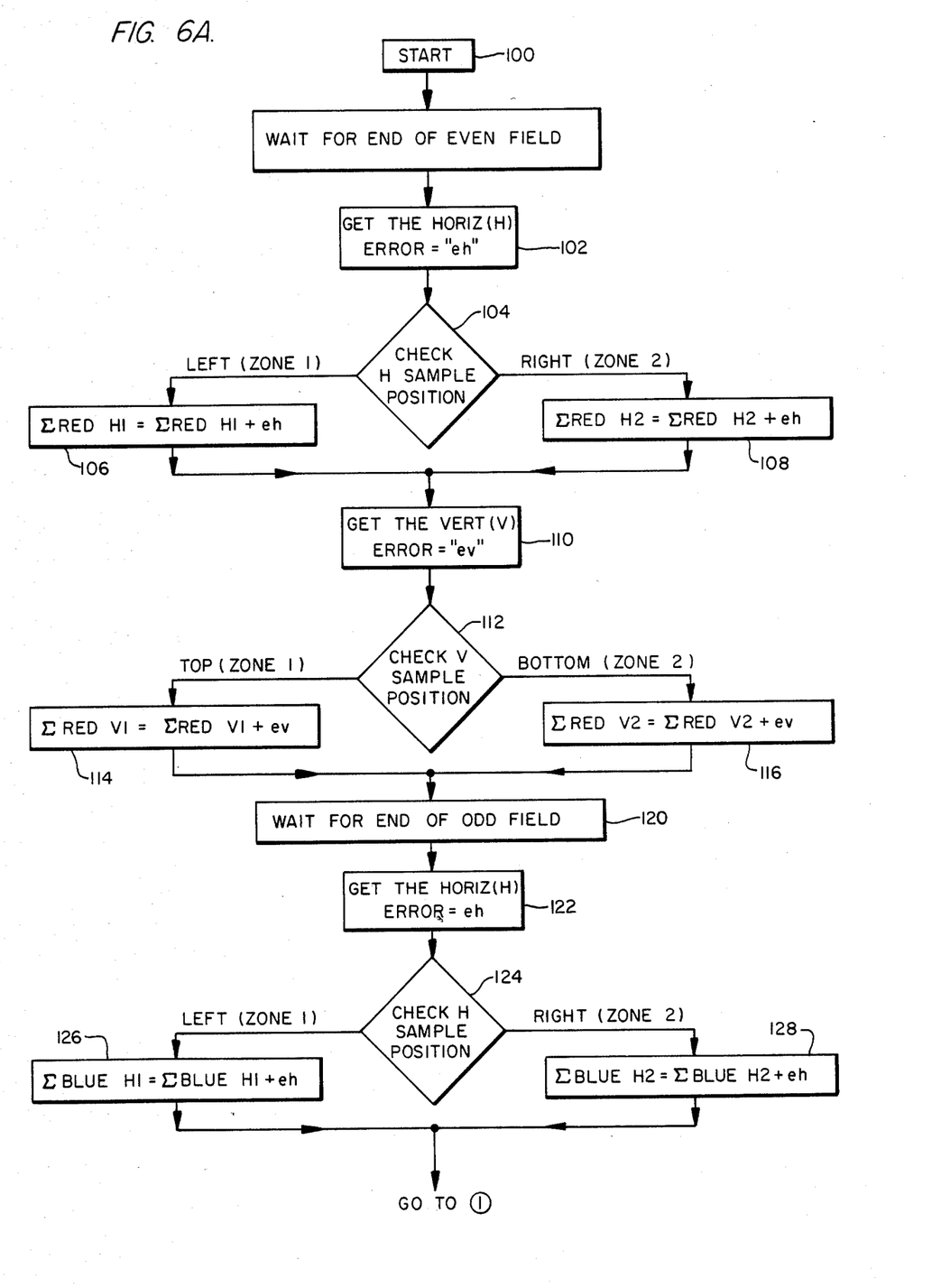
FIGS. 6A–6C are a flow chart illustrating a method of detecting and correction registration errors in accordance with the invention.
Figure 6B:
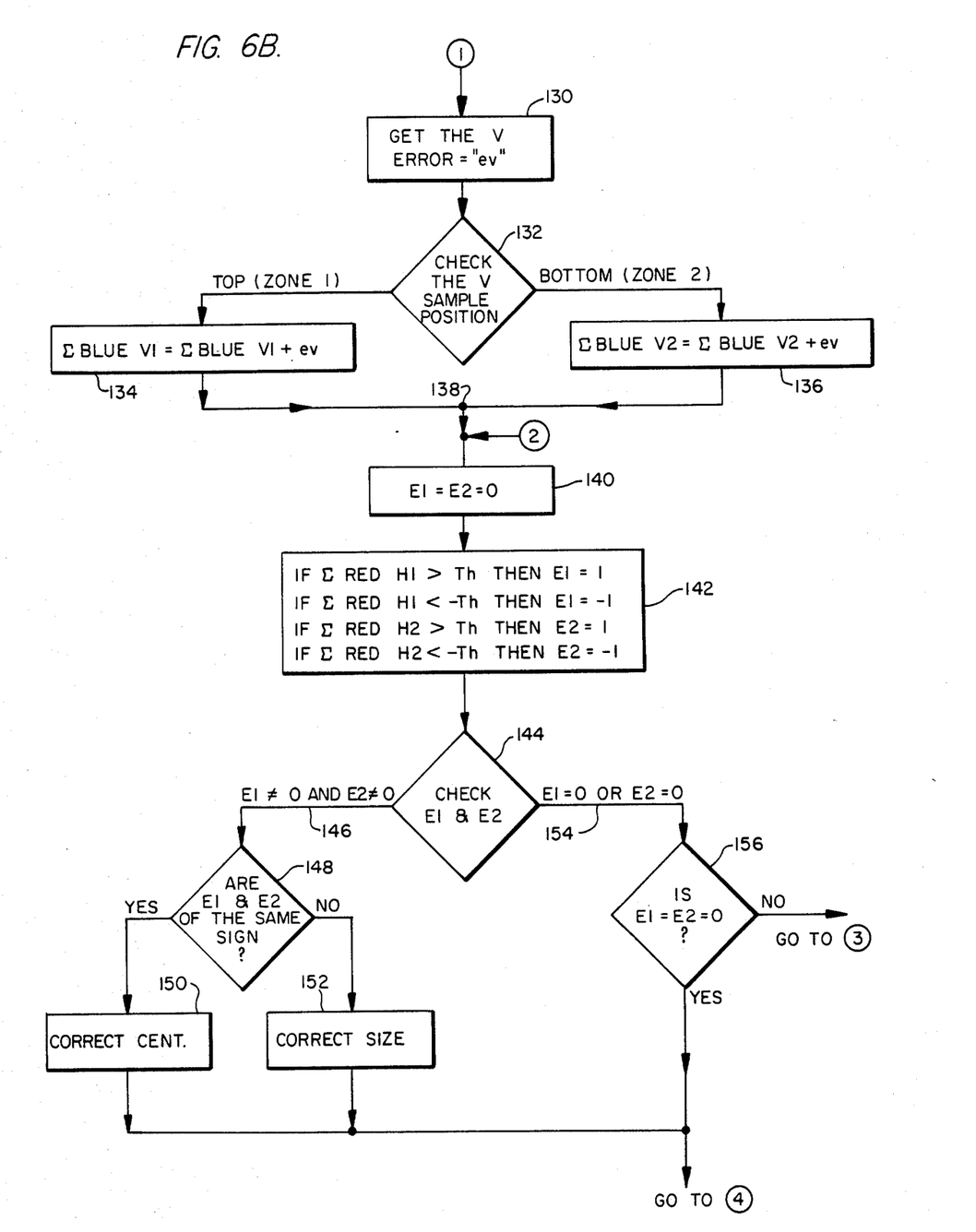
Figure 6C:
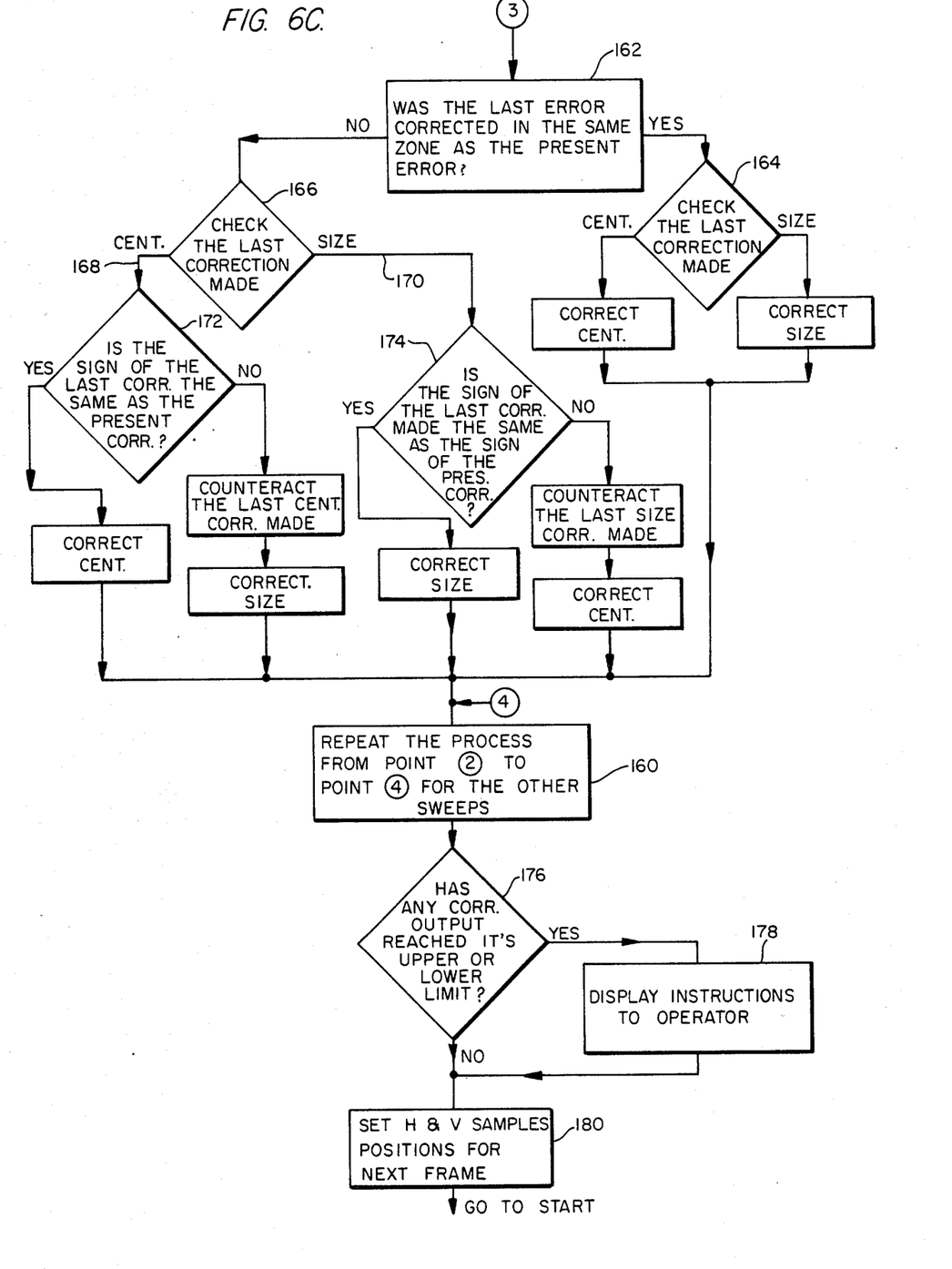

Block 64 in FIG. 5 comprises the controller. As shown, and as previously mentioned, the controller preferably comprises a microprocessor system 66, including associated logic and memory. The microprocessor may drive a digital-to-analog (D/A) converter 68, which in turn drives a multiplexer and associated analog output stages 70. The microprocessor may receive as timing signals the horizontal drive signal from the camera and an even field pulse, which is produced for each even raster field. The microprocessor generates the horizontal and vertical sample positions, in the manner previously described, for example, and supplies the horizontal and vertical sample positions to the error detection untis via appropriate outputs (so labelled) of multiplexer 70. During even fields, the horizontal and vertical registration error detection units compare the red video with the green video and supply horizontal and vertical error signals to the microprocessor to indicate misregistrations that are detected. During odd fields, the blue video is compared with the green video, and appropriate horizontal and vertical error signals are supplied to the microprocessor for any misregistrations detected. The microprocessor may accumulate and store the error signals, periodically analyze the accumulated error signals to determine the type of registration error present, and generate an appropriate eight-bit digital correction signal that is converted to an analog signal by the D/A converter and applied to the sweep circuits of the blue or red tubes to correct the registration error. The various outputs from multiplexer 70 for red and blue horizontal and vertical centering and size are actually DC voltages that are applied to the camera sweep circuits for each sweep to modify the manually adjusted centering and size voltages. The DC voltages are produced from eight-bit digital words generated by the microprocessor for each sweep, and may range from ±3 volts, for example. FIGS. 6A–6C illustrate in detail the preferred method for analyzing the error signals and for generating correction signals. However, prior to presenting a detailed description of FIGS. 6A–6C, it will be helpful first to describe briefly the concepts employed.

Figure 7:
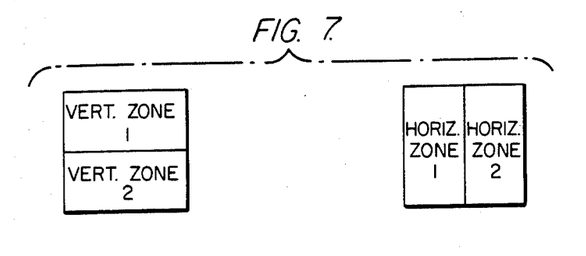
FIGS. 7, 8A–8B, and 9 are diagrammatic views of raster displays that are useful in describing the operation of the invention.

For detecting and correcting horizontal and vertical centering and size errors, the raster may be divided into two vertical zones or regions and two horizontal zones or regions, as illustrated in FIG. 7. Each time an error signal is received by the microprocessor, the signal is stored in a manner that associates it with the particular zone in which it was detected. For example, vertical error signals resulting from samples located in the upper region of the raster are associated with vertical zone 1, while those resulting from samples in the lower half of the raster are associated with zone 2. Similarly, horizontal error signals produced by samples in the left half of the raster are associated with horizontal zone 1, while those produced by samples in the right half of the raster are associated with horizontal zone 2.

Figure 8A:
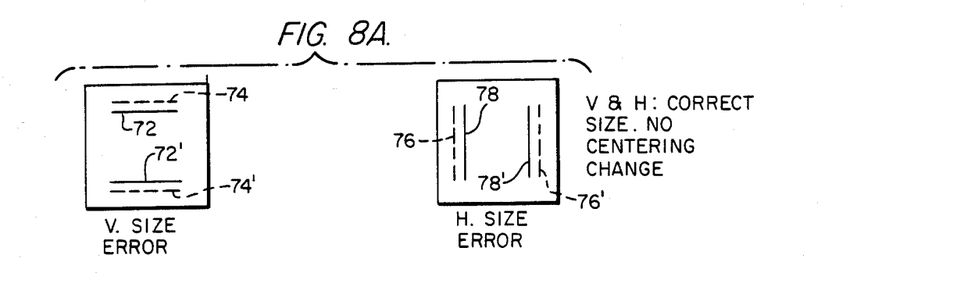
Figure 8B:
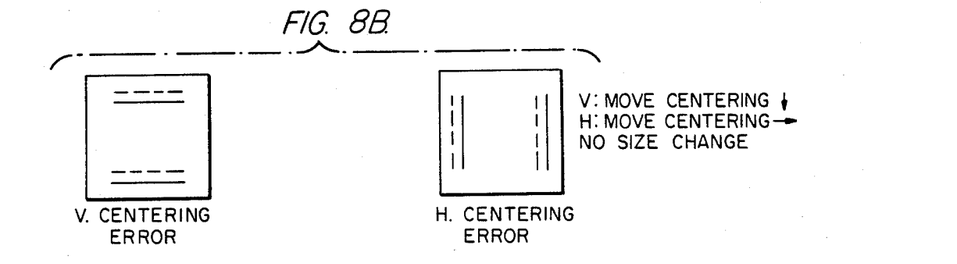

FIGS. 8A and 8B illustrate, respectively, size and centering errors. Assume that a scene being scanned by the camera comprises two horizontal or two vertical lines, each line being located in a different raster zone, and assume that the dotted lines represent either the blue or the red video and the solid lines indicate the green or reference video. From FIG. 8A, it will be noted that if a size error is present the directions of misregistration in the two zones will be different, whereas if a centering error is present (as illustrated in FIG. 8B), the directions of misregistration in the two zones will be the same.

As shown in FIG. 8A, if a vertical size error is present, the vertical registration error detection unit will detect the misregistration between lines 72 and 74 and produce error signals associated with vertical zone 1 that are negative, for example, indicating that the video line 74 leads the reference video line 72. However, the vertical error signals associated with vertical zone 2 will be positive, since video line 74' is lagging reference video line 72'. Similarly, if a horizontal size error is present the horizontal error signals associated with horizontal zone 1 will be negative, and those associated with horizontal zone 2 will be positive. Upon analyzing the error signals, the system of FIG. 5 will detect that the error signals associated with the two regions have different signs, correctly identify the registration error as being a size error, and issue a correction signal by appropriately modifying the digital word that corresponds to the required correction.

On the other hand, if a centering error is present as shown in FIG. 8B, the vertical error signals associated with both vertical zones 1 and 2 will be negative, and the horizontal error signals associated with both horizontal zones 1 and 2 will be negative. Accordingly, the system will correctly interpret the errors as being centering errors and apply appropriate correction signals to the horizontal and vertical sweep circuits. It should be noted, that the signs of the error signals also indicate the directions in which corrections should be made.

Figure 9:
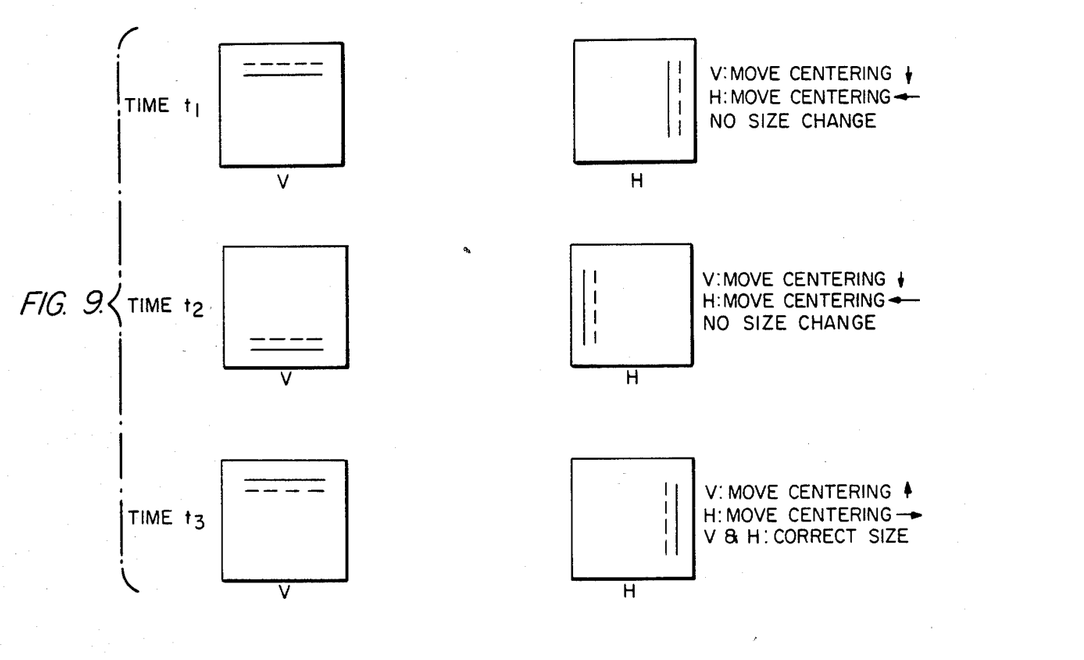

When performing registration correction using a live scene, as opposed to a set-up chart or other predetermined pattern of figures, there may be insufficient detail in the different raster regions to enable misregistration in such regions to be detected. Referring to FIG. 9, a sequence of rasters at three different times $t_1$, $t_2$, and $t_3$ which have vertical or horizontal detail in only one zone is illustrated. At time $t_1$, assume that vertical or horizontal misregistration such as illustrated in the figure is detected. Since misregistration is detected in only one of the two zones, the system may first assume that the misregistration is caused by a centering error, and issue correction signals to move the raster in the appropriate direction as indicated by the sign of the error signals. Subsequently, at time $t_2$, if misregistration is detected in the other raster zone and has the same direction as the misregistration detected at $t_1$, the system recognizes the fact that the present misregistration is in a different zone and checks the last correction that was made. Since the misregistration is in the same direction, and the last correction was a centering correction, the system assumes that a centering error is still present and issues another centering correction.

Subsequently, at $t_3$, assume that the vertical or horizontal misregistration illustrated in FIG. 9 is detected. Since the misregistration is not in the same zone as the last error corrected (at $t_2$) and the direction of misregistration is different than it was at $t_2$, the system determines that the last correction made, i.e., centering, was incorrect. Accordingly, the system counteracts the last correction and issues an appropriate size correction signal.

The system of FIG. 5 determines the type of registration error that is present by analyzing the values, distribution, and past history of errors corrected. In a preferred form, the invention has a fast operating mode and a slow operating mode. In the fast operating mode, accumulated errors may be analyzed after every frame and correction signals having increments corresponding to changes in the three lower order bits, for example, of the eight-bit digital correction signal word may be employed. The fast operating mode is useful during camera set-up to rapidly correct gross registration errors. The slow operating mode is a mode that would normally be used when the camera is on-air. In this mode, error signals are accumulated for a large number of frames, e.g., 16 frames, and registration is corrected slowly and in small increments, as by changing only the least significant bit of the eight-bit digital correction signal word. Thus, each correction signal may partially correct the registration error, and successive correction signals may be required to completely correct the error. However, this avoids abrupt changes in the televised picture.

The flow chart of FIGS. 6A-6C illustrates in detail a preferred method of analyzing the error signals produced by the error detection units to determine the type of registration error present. The flow chart represents the sequence of operations which may be performed by the microprocessor system 66, and can be translated directly into a program for the microprocessor.

Beginning at the top of FIG. 6A with "Start" block 100, at the end of the even field, during which time the red video was applied to the horizontal and vertical registration error detection units, the microprocessor reads the red horizontal error signal (at 102) from the horizontal error detection unit, and assigns it a value of +1, −1, or 0, depending upon whether it is positive, negative, or zero. The microprocessor checks the horizontal sample position (at 104) which information it has since the microprocessor selects the horizontal and vertical sample positions as previously described, and decides whether the horizontal sample position is located in the left (zone 1) or right (zone 2) half of the raster. The error signal is processed by adding it to the red horizontal error record stored in a memory location associated with the particular zone in which the error was detected, in effect, integrating the error with previously detected errors. For example, if the horizontal sample position was located in zone 1, the error signal would be added to the "Red H1" record at 106. However, if it was in zone 2, it would be added to the "Red H2" record at 108.

Next, the red vertical error signal is obtained from the vertical error detection unit (at 110), and the vertical sample position is determined (at 112). As with the red horizontal error signal, the red vertical error signal is assigned a value of +1, −1, or 0, depending on whether it is positive, negative, or zero. The red vertical error signal is then added (either at 114 or 116) to the red vertical error record stored in a memory location associated with the particular zone of the raster, i.e., top or bottom, in which the vertical sample position was located.

At the end of the odd field (120), during which time the red video was applied to the horizontal and vertical error detection units, the above-described process is repeated for the blue horizontal and vertical error signals. The blue horizontal error signal is obtained (at 122), the horizontal sample position is checked (at 124), and the blue horizontal error signal is added (at either 126 or 128) to the blue horizontal record stored in a memory location associated with the zone in which the horizontal sample position was located. Next, as shown at the top of FIG. 6B, the blue vertical error signal is obtained (at 130), the vertical sample position is checked (at 132), and the blue vertical error signal is added (at 134 or 136) to the blue vertical record stored in the memory location associated with the particular zone in which the vertical sample position was located.

To this point, the process has obtained, during one frame and for one selected horizontal and vertical sample position, horizontal and vertical errors for the red and blue component color video signals, has associated each error with the region of the raster in which it was detected, and has accumulated each error with previously detected horizontal or vertical errors of the same color in that region. The remainder of the process relates to the analysis of the errors and the generation of correction signals. As noted previously, in the slow mode it is desirable to accumulate errors over a large number of frames, e.g., 16 frames, prior to analyzing the errors. Accordingly, the portion of the process between block 100 (FIG. 6A) and point 138 (FIG. 6B) may be iterated with new sample positions for the desired number of frames prior to continuing with the analysis portion of the process. In the fast mode, the analysis portion of the process may proceed after each frame.

Analysis of the errors begins at block 140 of FIG. 6B. The red horizontal errors are first analyzed and an appropriate correction signal is generated. Then the analysis is repeated for the other sweeps, i.e., red vertical and blue horizontal and vertical.

At block 140, regional error signals E1 and E2 are initialized. Next (at 142) the accumulated red horizontal errors in each zone are compared to an error tolerating threshold interval (−Th to +Th) and the regional error signal for each zone is assigned a value of +1, −1, or 0, depending upon whether the magnitude of the accumulated errors for the zone is greater than, less than, or within the threshold interval. At 144, the regional error signals for zones 1 and 2 are compared. If they are both non-zero (branch 146), their signs are compared (at 148). If E1 and E2 are of the same sign, the registration error is interpreted as being a centering error, and a centering correction is made (at 150). Otherwise, the registration error is interpreted as being a size error, and a size correction is made (at 152).

At decision block 144, if either E1 or E2 is 0, path 154 is followed. At 156, a check is made to determine whether both are 0. If so, it is determined that there are no red horizontal errors, and the process jumps to point 4 (FIG. 6C) and the analysis process is repeated (at 160) for the other sweeps. If, however, either E1 or E2 is non-zero, the analysis continues with block 162 (at the top of FIG. 6C) where a check is made to determine whether the last error corrected was in the same zone of the raster as the present error. If it was, the type of the last correction made is determined (at 164), and the same correction is repeated. The process then repeats the analysis (at 160) for the other sweeps.

At 162, if the last error corrected was not in the same zone as the present error, the last correction made is determined (at 166). Depending upon whether the last correction was a centering or size correction, the process follows path 168 or path 170. In either case, the sign of the last error corrected is compared with the sign of the present error (at 172 or 174), and if the signs are the same, the last correction is repeated. However, if the signs are different, the last correction made, e.g., centering, is counteracted, and another type of correction, e.g., size, is made.

The analysis is then repeated for each of the other sweeps and appropriate correction signals are generated (at 160). At 176, a check is made to determine whether any correction output has reached its upper or lower limit. If so, appropriate instructions are displayed at 178 (as on the camera monitor) to the camera operator instructing him to perform a manual adjustment. Horizontal and vertical sample positions for the next frame are then selected (at 180) and the process is repeated from the start.

Although the error analysis and correction method of FIGS. 6A–6C was described in the context of centering and size errors only, it is evident that the principles of the invention may be readily applied to the detection and correction of other types of errors. Instead of dividing the raster into only two regions (zones), it may be divided into a large number of regions, the errors accumulated separately for each of the different regions, and the analysis performed using different combinations of regions. Moreover, for cameras that generate the sweep voltages for the camera tubes digitally, as by reading stored digital values from a memory, it becomes a simple matter to store the correction signals digitally, and to use them to modify the stored values that generate the sweeps.

While a preferred embodiment of the invention has been shown and described, it will be apparent to those skilled in the art that changes can be made in this embodiment without departing from the principles and spirit of the invention, the scope of which is defined in the appended claims.

What is claimed is:

1. A method of automatically correcting registration errors in a color television camera that raster scans a scene and produces video signals representative of different component colors of the scene, comprising sampling first and second component color video signals at a plurality of different points in the raster to detect amplitude level transitions associated with the edges of objects in the scene; comparing corresponding transitions for time coincidence to detect misregistration of the first and second video signals; for each misregistration detected, producing an error signal; accumulating separately for each of preselected regions of the raster a plurality of the error signals produced in each region; analyzing the accumulated error signals associated with different regions of the raster to determine the type of registration error present; and, based upon the analysis, generating a correction signal to correct the registration error.

2. A method of automatically correcting registration errors in a color television camera, comprising sampling first and second video signals produced by the camera that are representative of different component colors of a scene being raster scanned by the camera, the video signals being sampled at a plurality of raster points to detect amplitude level transitions of the first and second video signals associated with the edges of objects in the scene; comparing corresponding transitions to detect misregistration of the first and second video signals; for each misregistration detected, producing an error signal; storing the error signal in a manner that associates the error signal with a region of the raster in which the misregistration was detected and integrates it with previously detected error signals; analyzing the stored error signals to determine the type of registration error present by comparing the integrated error signals associated with different preselected regions of the raster; and, based upon the analysis, generating an appropriate correction signal to correct the registration error.

3. The method of claim 1 or 2, wherein each error signal has a value indicating the direction of misregistration.

4. The method of claim 1 or 2, wherein the midpoints of the transitions are compared to detect said misregistrations.

5. The method of claim 1 or 2, wherein the error signals have values, and wherein said analyzing comprises analyzing the distribution of error signals among the regions, the values of the error signals, and the past history of registration errors.

6. The method of claim 1, wherein said accumulating comprises accumulating error signals for a predetermined number of raster frames prior to said analyzing.

7. The method of claim 1, wherein each error signal has a value, and wherein said accumulating comprises adding the values of the error signals associated with each region to previously accumulated values of error signals for such regions.

8. The method of claim 7, wherein said analyzing comprises comparing the values of accumulated error signals associated with different regions of the raster.

9. The method of claim 1, wherein said analyzing comprises comparing accumulated error signals for each region with a predetermined threshold interval, and producing, for each region, a regional error signal when the accumulated error signals for such region have a magnitude that exceeds the threshold interval, the regional error signal having a sign indicating the direction of the registration error in its associated region.

10. The method of claim 9, wherein the registration errors comprise centering and size errors, and said analyzing comprises comparing the signs of first and second regional error signals associated with first and second regions of the raster, determining the registration error to be a centering error, when the regional error signals have the same sign, and determining the registration error to be a size error when the regional error signals have opposite signs.

11. The method of claim 10, wherein a correction is made in response to each correction signal, and wherein if the first regional error signal is zero and the second regional error signal is non-zero, determining the type of registration error present by determining the region in which the last registration error was detected and the type of correction made.

12. The method of claim 11, wherein the last correction made is repeated if the non-zero regional error signal is associated with the same region in which the last correction was made, and wherein, if the non-zero regional error signal is not associated with the same region in which the last correction was made, comparing the sign of the last correction made with the sign of the non-zero regional error signal, repeating the last correction if the signs are the same, and making a different type of correction if the signs are different.

13. The method of claim 1, wherein the video signals produced by the camera correspond to horizontal lines of the raster and vary in amplitude along the lines in accordance with the brightness of objects in the scene, and wherein the first and second video signals are derived by sampling each video signal at a point corresponding to a predetermined horizontal raster position, and combining the samples such that the first and second video signals each have an amplitude that varies in accordance with the brightness of objects in the scene along a vertical line located at the horizontal position.

14. The method of claim 1 or 2, wherein said generating comprises successively generating correction signals that partially correct the registration error.

15. An automatic registration correction system for a color television camera that raster scans a scene and produces video signals that represent different component colors thereof, comprising means for sampling first and second component color video signals at a plurality of points in the raster to detect amplitude level transitions associated with the edges of objects in the scene; means for comparing corresponding transitions of the first and second video signals for time coincidence to detect misregistration of the first and second video signals; means for producing an error signal for each misregistration detected; means for accumulating separately for each of preselected regions of the raster a plurality of the error signals produced in each region; means for analyzing the accumulated error signals associated with different regions of the raster to determine the type of registration error present; and means for generating, based upon the analysis, a correction signal to correct the registration error.

16. The system of claim 15, wherein the accumulating means comprises storage means associated with each region for storing previously accumulated error signals produced in such region, and means for adding the error signal associated with a particular region to the previously accumulated error signals for that region.

17. The system of claim 15, wherein each error signal has a value indicating the direction of misregistration, and wherein said analyzing means comprises means for comparing values of accumulated error signals associated with different regions.

18. The system of claim 17, wherein the analyzing means comprises means for determining the type of registration error by analyzing the distribution of error signals among the regions, the values of the error signals, and the past history of registration errors.

19. The system of claim 18, wherein said accumulating means and said analyzing means comprise microprocessor means.

20. The system of claim 15, wherein said means for comparing corresponding transitions comprises means for determining the midpoints of the transitions, and means for comparing said midpoints.

21. The system of claim 20, wherein said determining means comprises means for forming the second derivative of each video signal, and zero crossing detector means for detecting the zero crossings of the second derivative.

22. The system of claim 21, wherein said means for comparing midpoints comprises phase comparator means connected to said zero crossing detector means for comparing the phase of the zero crossings and for producing an output signal representative of said comparison, said output signal being said error signal.

23. The system of claim 15, wherein the video signals produced by the camera correspond to horizontal lines of the raster and vary in amplitude along the lines in accordance with the brightness of objects in the scene, and wherein the system further comprises sample-and-hold means for sampling the video signals along each horizontal line of the raster at a point corresponding to a predetermined horizontal sample position to produce first and second video signals having amplitudes that vary with the brightness of objects in the scene along a vertical line located at said predetermined horizontal sample position, the first and second video signals comprising the first and second video signals sampled by said sampling means.

* * * * *